United States Patent
Knetsch et al.

(10) Patent No.: US 8,429,900 B2
(45) Date of Patent: Apr. 30, 2013

(54) LIQUID CONTAINER FOR MOTOR VEHICLES

(75) Inventors: Holger Knetsch, Dachau (DE); Josef Kreutmair, Pfaffenhofen (DE); Robert Zenz, Markt Indersdor (DE); Reinhard Eckert, Puchheim (DE)

(73) Assignee: MAN Truck & Bus AG (DE)

( * ) Notice: Subject to any disclaimer, the term of this patent is extended or adjusted under 35 U.S.C. 154(b) by 297 days.

(21) Appl. No.: 10/835,487

(22) Filed: Apr. 29, 2004

(65) Prior Publication Data

US 2004/0217103 A1 Nov. 4, 2004

(30) Foreign Application Priority Data

Apr. 29, 2003 (DE) .................................. 103 19 151

(51) Int. Cl.
*F01N 3/00* (2006.01)
(52) U.S. Cl.
USPC .................. 60/286; 60/295; 60/301; 60/303; 60/300
(58) Field of Classification Search .................... 60/286, 60/295, 301, 303, 300
See application file for complete search history.

(56) References Cited

U.S. PATENT DOCUMENTS

| | | | | |
|---|---|---|---|---|
| 3,536,196 A | * | 10/1970 | Zeff et al. | 210/97 |
| 3,895,137 A | * | 7/1975 | Avramidis et al. | 427/295 |
| 4,753,080 A | * | 6/1988 | Jones et al. | 62/59 |
| 5,884,475 A | * | 3/1999 | Hofmann et al. | 60/274 |
| 6,223,526 B1 | * | 5/2001 | Wissler et al. | 60/286 |
| 6,399,034 B1 | * | 6/2002 | Weisweiler | 423/213.2 |
| 6,519,935 B2 | * | 2/2003 | Weigl | 60/286 |
| 6,701,784 B1 | * | 3/2004 | Matusek et al. | 73/313 |
| 6,878,359 B1 | * | 4/2005 | Mathes et al. | 423/239.1 |
| 6,935,103 B2 | * | 8/2005 | Binder et al. | 60/286 |
| 2003/0033799 A1 | * | 2/2003 | Scheying | 60/286 |

FOREIGN PATENT DOCUMENTS

| | | |
|---|---|---|
| DE | 198 42 484 | 12/1999 |
| DE | 100 59 549 | 6/2002 |
| EP | 0 555 746 | 8/1993 |

* cited by examiner

*Primary Examiner* — Thomas Denion
*Assistant Examiner* — Diem Tran
(74) *Attorney, Agent, or Firm* — Robert W. Becker; Becker & Stachniak, P.C.

(57) ABSTRACT

A liquid container for motor vehicles, especially for an aqueous urea solution, is provided. The container has an interior space into which the liquid can be fed, and also has an upwardly disposed wall to close off the interior space of the container in a fluid type manner. Provided between a maximum liquid level at a maximum filling state in the interior space of the container, and an inner side of the upwardly disposed container wall, is a free space that corresponds to an increase in volume, including the "blooming", of the liquid that has frozen in the interior space of the container.

14 Claims, 2 Drawing Sheets

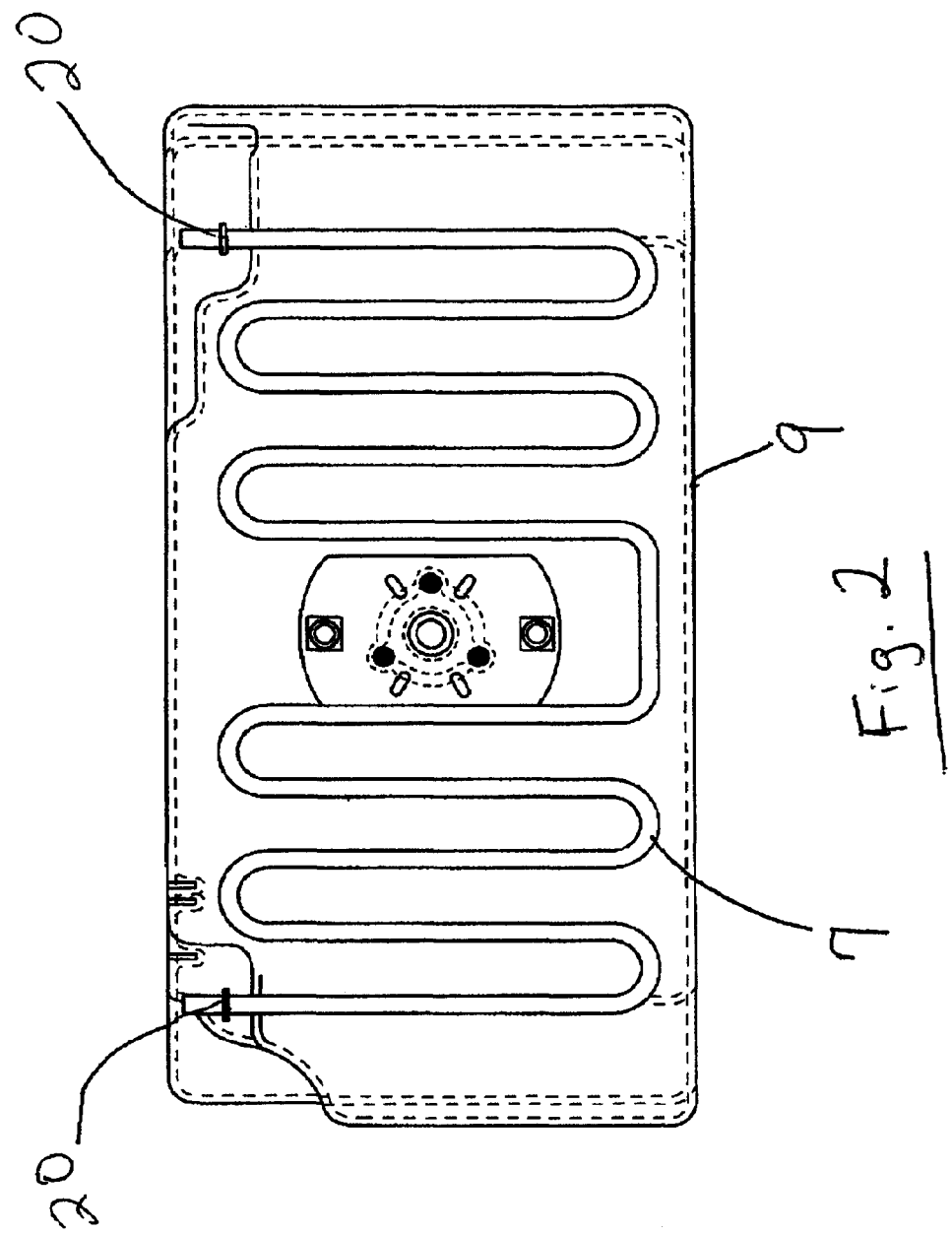

LIQUID CONTAINER FOR MOTOR VEHICLES

BACKGROUND OF THE INVENTION

The present invention relates to a liquid container, for example for motor vehicles, and in particular for an aqueous urea solution.

It is known from EP 0 555 746 A1 to supply aqueous urea solution from a liquid container to a hydrolysis device in which the urea is decomposed into ammonia ($NH_3$) and carbon dioxide ($CO_2$). The gas mixture of ammonia, $CO_2$ and exhaust gas of an internal combustion engine, especially a diesel engine, is conveyed to a selective reduction catalytic converter (SCR catalytic converter) in which a $NO_x$ reduction takes place. This avoids the preparation and storage of ammonia, with the safety precautions that are necessary in conjunction therewith.

At low outside temperatures, the aqueous urea solution in the interior space of the container can freeze. This results in the danger of damage to the container due to the increase in volume of the frozen urea solution.

It is therefore an object of the present invention to provide a liquid container of the aforementioned general type with which a reliable preparation of the liquid, especially of the aqueous urea solution, is ensured.

BRIEF DESCRIPTION OF THE DRAWING

This object, and other objects and advantages of the present invention, will appear more clearly from the following specification in conjunction with the sole FIGURE of the drawing, which schematically illustrates one exemplary embodiment of an inventive liquid container.

SUMMARY OF THE INVENTION

Figure 1:
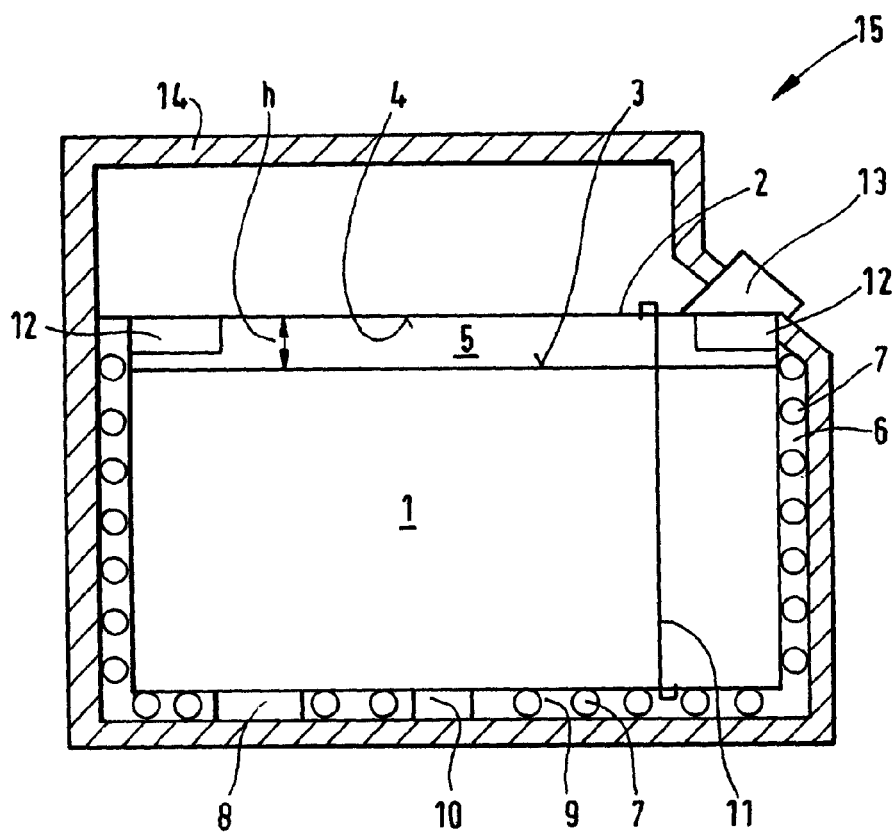

The liquid container of the present application comprises a container having an interior space into which liquid can be fed, wherein the container is provided with an upwardly disposed wall for a liquid tight closure of the interior space, a filling device for feeding liquid into the interior space, and a withdrawal device for removing liquid from the interior space, wherein a free space is provided between a maximum liquid level at a maximum filling state in the interior space of the container, and an inner side of the upwardly disposed wall, wherein the free space corresponds to an increase in volume of a liquid that has frozen in the interior space of the container.

Pursuant to the container of the present application, a free space is formed between a maximum filling state level at a maximum filling state of the liquid in the interior of the container, and the inner side of an upwardly disposed container wall that closes off the interior space of the container in a liquid tight manner. This free space corresponds to an increase in volume, especially a "blooming", of the liquid that has frozen in the interior of the container.

The blooming is the last stage in the freezing process, for example of the urea solution, and is effected in the upper region of the original liquid and approximately in the middle of the container.

During a driving operation, a freezing of the liquid can be prevented with the aid of a heating means, which is integrated, for example, in the base of the container. The heating means is preferably heated by the engine coolant. For this purpose, the heating tubes of the heating means can be connected to the coolant circuit of the internal combustion engine, especially of the diesel engine. However, the heating means can also be operated electrically, and for this purpose can be embodied as an electrical heating means.

To realize the object of the present application, it is possible to provide in the container only the free space or the heating means, or both the free space as well as the heating means.

However, in each of the aforementioned embodiments the container must be embodied in such a way that the contents of the container can freeze without destroying the container.

The heating means is preferably integrated into the container wall, so that no components of the heating means project into the interior space of the container, in which the liquid is disposed. Furthermore, the interior space of the container can be thermally insulated toward the outside either partially or entirely. For this purpose, a thermal insulation can be provided on the outer side of the container at appropriate locations.

The heating means can, however, also be integrated into the insulation, and can thus be disposed as a structural unit, for example on the outer side of the base of the container.

A withdrawal device for removal of the liquid from the interior space of the container is preferably provided in the container base. Furthermore, a device for measuring the filling state, in particular an ultrasound filling state measuring device, can be disposed in the base. This device makes it possible to monitor the filling state of the liquid in the container at any given time.

Furthermore provided is a pressure equalizing device that provides for a pressure equalization between the interior space of the container in the region of the base, and the interior space of the container above the liquid level.

The pressure equalizing device is effective when the container contents are partially or entirely frozen, and a thawing of the container contents begins with thermal action from the outside. Liquid is then initially formed in the vicinity of the base of the interior space of the container and can be withdrawn via the withdrawal device.

As a result of this process, an underpressure can result in the region of the base of the container, which inhibits the pressure equalizing device.

The device for measuring the filling state, the pressure equalizing device, and the withdrawal device, are designed in such a way that they do not at all, or only slightly, project into the interior space of the container where the liquid is kept available. This prevents damage to these components if the liquid freezes.

The line or conduit of the pressure equalizing device is made of elastic material, for example rubber, and is preferably placed in the wall, or outside of the wall, of the container.

The withdrawal device is preferably connected to a hydrolysis device, ahead of a catalytic $NO_x$ reduction device, in the exhaust gas stream of an internal combustion engine, especially a diesel engine. The internal combustion engine, especially a diesel engine, can also be operated in a stationary apparatus.

The danger of destruction of the liquid container can also occur with other liquids that can freeze in the interior space of the container. The container described herein is also suitable for the storage and preparation of such other liquids.

Further specific features of the present invention will be described in detail subsequently.

BRIEF DESCRIPTION OF THE DRAWINGS

FIG. 1 shows the tank or container for holding a liquid, preferably an aqueous urea solution, according to the present invention; and FIG. 2 shows the tank of the present invention, pressure equalizing device, and connectors extending only slightly into the interior space of the tank.

DESCRIPTION OF SPECIFIC EMBODIMENTS

Referring now to the drawings in details, the tank or container for liquid, especially for an aqueous urea solution, that is illustrated in FIG. 1 includes an interior space 1 of the container into which a liquid, especially an aqueous urea solution, can be fed via a filling device 13, for example a filler pipe or similar element, in the upper portion of the container. The liquid can be introduced into the interior space 1 of the container 15 up to a maximum liquid level 3 (maximum filling state). Toward the top, the interior space 1 of the container is closed off in a liquid tight manner by an upwardly disposed container wall 2, which forms a cover.

Provided between the maximum liquid level 3 and an inner side 4 of the upwardly disposed container wall 2 is a free space 5. This free space 5 is formed by an appropriate spacing h between the maximum liquid level 3 and the inner side 4 of the container wall 2. As a result, if a "blooming" takes place at the upper side of the frozen liquid, it is possible for a space, which corresponds to an increase in volume in the liquid, to be present toward the upwardly disposed container wall 2. By providing the free space 5, a greater deformation of all of the container walls (2, 6, 9), and a destruction of the container 15 that could result therefrom, is prevented.

Preferably, only the container base or base wall 9 is provided with a heating means 7. However, it is also possible to integrate a heating means 7 into the side container walls 6. This heating means 7 can comprise heating tubes that are connected to the coolant circuit of the non-illustrated internal combustion engine. The heating means 7 could also be an electrical heating means. A heating means that is connected to the coolant circuit of the internal combustion engine is preferably utilized.

Disposed in the container base 9 is a withdrawal device 8 for the removal of the liquid from the interior of the container. The withdrawal device 8 can be connected to a hydrolysis catalytic converter, such as is known from EP 0 555 746 A1. As already explained, the withdrawal device is embodied in such a way that it does not project at all, or only slightly, into the interior space 1 of the container.

Furthermore disposed in the container base 9 is a device 10 for measuring the filling state. This filling state measuring device 10 is preferably embodied as an ultrasonic measuring device, those surfaces of which emit the ultrasonic waves, and those surfaces of which that receive the reflected sonic waves, are directed upwardly in a direction toward the liquid level. The device 10 for measuring the filling state makes it possible to have a constant monitoring of the filling state in the interior space 1 of the container 15.

If the contents of the container 15 are frozen, the filling state measuring device 10 delivers a type of error signal. A non-illustrated temperature sensor can be integrated into the filling state measuring device 10. On the basis of the container temperature, or of the outside temperature, the error signal can be converted, so that the vehicle driver obtains a corresponding, understandable signal from the indicator board and a gauge or indicator in the instrument panel or dash board. The onboard computer also recognizes the outside temperature. In the event that the error signal of the filling state measuring device 10 is not converted by the device 10 itself, such a conversion can be effected in the onboard computer, so that also in this case the vehicle driver obtains an understandable signal.

For the filling of the interior space 1 of the container 15, a device is provided by means of which the liquid cannot be fed in over the greatest permissible liquid level 3. For example, a dispenser that automatically shuts off can be used for this purpose.

Furthermore provided is a pressure equalizing device 11 that provides for a pressure equalization between the space above the liquid level 3 and the interior space 1 of the container in the region of the container base 9.

The pressure equalizing device 11 is schematically illustrated. It can comprise an elastic line, for example a rubber conduit, and respectively a connector 20 in the container wall 9 and the container wall 2 or the container wall 6. The aforementioned connectors 20 preferably do not project at all or only slightly into the interior space 1 of the container (see FIG. 2). The elastic or rubber line is not mounted in the interior space 1 of the container, but rather within the container walls 6, 9 or within the insulation 14 or externally of the container 15. The pressure equalizing device 11 becomes active if the contents of the container are partially or entirely frozen, and a thawing of the frozen container contents begins by means of a thermal effect from the outside.

If the container 15 has no heating means 7, this thawing process can be effected, for example, by a higher outside temperature. If the container 15 is provided with a heating means 7, the thawing process begins with the heating of the container, for example when the internal combustion engine is started.

In both cases, first the frozen contents in the vicinity of the container base thaw. The withdrawal device 8 can then already make available, in the application described here, urea liquid to the hydrolysis unit. So that no underpressure results in the region near the base due to the withdrawal of the urea liquid, which could also destroy the container, the pressure equalizing device 11 is provided.

Furthermore, the pressure equalizing device 11 ensures relatively rapidly that the urea metering functions before a large portion of the frozen material is thawed.

The securement of the container on a supporting structure, for example of a motor vehicle or of a stationary device, is effected via mounting means 12 that are provided in the upper region of the container, especially in the region of the free space 5. The container mounting means 12 are thus disposed in a region in which the danger of deformation of the container due to freezing of the liquid is low.

The container can be entirely (as shown in the drawing) or partially surrounded by a thermal insulation 14 that is disposed on the outside. The thermal insulation 14 can also be formed by a cover placed over the container and an insulation of the container base.

However, it is also conceivable to provide an insulation 14 and heating means 7 only for the container base 9. Furthermore, it is possible to extend the insulation 14 and the heating means 7 from the container base 9 up to the height of the maximum liquid level 3. In the cases indicated where the heating means 7 and insulation 14 are provided, the heating means can be integrated into the insulation.

The aforementioned measures reduce the possible number of freezing cycles.

In addition, the upwardly disposed container wall 2 can be embodied as a mounting platform for accessories that also convey urea.

The specification incorporates by reference the disclosure of German priority document 103 19 151.8 filed Apr. 29, 2003.

The present invention is, of course, in no way restricted to the specific disclosure of the specification and drawing, but also encompasses any modifications within the scope of the appended claims.

We claim:

1. A motor vehicle-mounted container for storing a urea-water solution, comprising:
    a container having an interior space into which liquid is fed, wherein said container is provided with an upwardly disposed wall for a liquid tight closure of said interior space;
    a filling device for feeding liquid into said interior space;
    a withdrawal device for removing liquid from said interior space, wherein a free space is provided between a maximum liquid level at a maximum filling state in said interior space of said container, and an inner side of said upwardly disposed wall, wherein said free space corresponds to an increase in volume of a liquid that has frozen in said interior space;
    a heating means integrated into at least one of a base of the container and into a lateral wall of the container, such that said heating means is completely embedded in and surrounded by at least one of a material of the base and a material of the lateral wall of the container;
    insulation material on an outer side of the container, said insulation material having heating means integrated therein, whereby said insulation material and said integrated heating means form a structural unit disposed only on an outer side of the base of the container; and
    a pressure equalizing device comprising a line and at least one connector, said at least one connector disposed in at least one of a base of the container and into a lateral wall of the container, wherein said at least one connector does not project into the interior space of the container, and wherein the line is mounted within at least one of a base of the container, a lateral wall of the container, or the insulation material or externally to said container, wherein said pressure equalizing device is configured to operate between the base of the container and said upwardly disposed container wall, wherein said pressure equalizing device is configured to become active if the contents of the container are partially or entirely frozen and to provide an equalization between pressure in a region of said container near said base thereof, and a pressure existing over said liquid level.

2. A liquid container according to claim 1, wherein a specific spacing is provided between said inner side of said upwardly disposed wall and said maximum liquid level for forming said free space.

3. A liquid container according to claim 1, wherein said heating means surrounds said interior space of said container.

4. A liquid container according to claim 1, wherein said heating means is operated with a coolant of an engine.

5. A liquid container according to claim 1, wherein said heating means is operated electrically.

6. A liquid container according to claim 1, wherein said withdrawal device is provided in said container base.

7. A liquid container according to claim 1, wherein a non-contact filling state measuring device is disposed in said container base.

8. A liquid container according to claim 7, wherein said filling state measuring device is an ultrasonic device.

9. A liquid container according to claim 1, which includes means for entirely or partially thermally insulating said container from the outside.

10. A liquid container according to claim 1, wherein a mounting means is provided in an upper portion of said container for securing said container to a supporting structure.

11. A liquid container according to claim 10, wherein said mounting means is provided in the vicinity or in the region of said free space.

12. A liquid container according to claim 1, wherein said withdrawal device is connected to a hydrolysis device of a catalytic $NO_x$ reduction device in an exhaust gas stream of an internal combustion engine.

13. A liquid container according to claim 12, wherein said internal combustion engine is a diesel engine.

14. A motor vehicle-mounted urea-water solution tank, comprising:
    a tank interior defined at a lower end by a tank bottom, laterally by side walls, and at an upper end by a top-mounted tank wall, wherein the tank interior can be filled up with the solution and the top-mounted tank wall provides fluid-tight closure of the tank interior;
    a filling device for filling the solution into the tank interior;
    a withdrawal device for extracting the solution from the tank interior;
    a heater integrated into at least one of the tank bottom and lateral tank side walls, such that said heater is completely integrated into said insulation material, thus being embedded in and surrounded by at least one of a material of the tank bottom and a material of a lateral tank side wall;
    insulation material having integrated heating means, whereby said insulation material and said integrated heating means form a structural unit disposed only on an outer side of the base of the container; and
    a pressure equalizing device comprising a line and at least one connector, said at least one connector disposed in at least one of a base of the container and into a lateral wall of the container, wherein said at least one connector does not project into the interior space of the container, and wherein the line is mounted within at least one of a base of the container, a lateral wall of the container, or the insulation material or externally to said container, wherein said pressure equalizing device is configured to operate between the base of the container and said upwardly disposed container wall, wherein said pressure equalizing device is configured to become active if the contents of the container are partially or entirely frozen and to provide an equalization between pressure in a region of said container near said base thereof, and a pressure existing over said liquid level.

\* \* \* \* \*